United States Patent [19]

Grosbois

[11] Patent Number: 5,389,298

[45] Date of Patent: * Feb. 14, 1995

[54] COLLOIDAL DISPERSIONS OF CERIUM (IV) COMPOUNDS IN AQUEOUS MEDIA

[75] Inventor: Jean Grosbois, L'Isle Adam, France

[73] Assignee: Rhone-Poulenc Chimie, Courbevoie, France

[*] Notice: The portion of the term of this patent subsequent to Jul. 21, 2009 has been disclaimed.

[21] Appl. No.: 51,590

[22] Filed: Mar. 3, 1993

Related U.S. Application Data

[63] Continuation of Ser. No. 892,694, May 27, 1992, abandoned, which is a continuation of Ser. No. 255,501, Oct. 11, 1988, abandoned.

[30] Foreign Application Priority Data

Oct. 9, 1987 [FR] France ................................ 87 13953

[51] Int. Cl.$^6$ .............................................. B01J 13/00
[52] U.S. Cl. .................. 252/313.1; 423/21.1; 423/263; 423/397; 502/304
[58] Field of Search .................. 252/313.1, 314; 502/304; 423/21.1, 263, 397

[56] References Cited

U.S. PATENT DOCUMENTS

| | | | |
|---|---|---|---|
| 3,024,199 | 3/1962 | Pasfield | 252/313.1 |
| 4,599,201 | 7/1986 | Gradeff et al. | 423/21.1 X |
| 4,606,847 | 8/1986 | Woodhead | 252/313.1 X |
| 4,647,401 | 3/1987 | Gradeff et al. | 423/21.1 X |
| 4,699,732 | 10/1987 | Woodhead | 252/313.1 X |
| 4,731,198 | 3/1988 | Watanabe et al. | 252/313.1 |
| 4,859,432 | 8/1989 | David et al. | 502/304 X |
| 5,021,192 | 6/1991 | David et al. | 423/395 X |
| 5,035,834 | 7/1991 | Chane-Ching et al. | 252/313.1 |
| 5,064,628 | 11/1991 | Chane-Ching et al. | 423/263 |
| 5,132,048 | 7/1992 | Picard-Seon et al. | 252/313.1 |
| 5,145,605 | 9/1992 | Chane-Ching | 252/313.1 |

FOREIGN PATENT DOCUMENTS 0078098 5/1983 United Kingdom.

OTHER PUBLICATIONS

Derwent Abstract, 87-272879/39.
Derwent Abstract, 83-12892K/06.
Derwent Abstract 87-009210/02.
Derwent Abstract, 87-272880/39.

*Primary Examiner*—Robert L. Stoll
*Assistant Examiner*—Daniel S. Metzmaier
*Attorney, Agent, or Firm*—Burns, Doane, Swecker & Mathis

[57] ABSTRACT

Weakly acidic colloidal dispersions of cerium (IV) compounds in aqueous media, the colloidal solids of which having the general formula $Ce(A)_x(NO_3)_y(OH)_{4-x-y}$, in which A is the anion of a water-soluble monovalent carboxylic acid having a $pK_a$ of from 2.5 to 5.0, are produced by (a) reacting and destabilizing an aqueous colloidal dispersion of a cerium (IV) compound with a water-soluble salt of such monovalent acid, (b) separating the precipitate which results, and (c) dispersing the precipitate thus separated in an aqueous medium, e.g., distilled water.

31 Claims, No Drawings

COLLOIDAL DISPERSIONS OF CERIUM (IV) COMPOUNDS IN AQUEOUS MEDIA

This application is a continuation, of application Ser. No. 07/892,694, filed May 27, 1992, which is a continuation of Ser. No. 07/255,501, filed Oct. 11, 1988, both now abandoned.

BACKGROUND OF THE INVENTION

1. Field of the Invention

The present invention relates to novel colloidal dispersions of a cerium (IV) compound in an aqueous medium and to a process for the preparation thereof. This invention more especially relates to colloidal dispersions of a cerium (IV) compound in a weakly acidic aqueous medium.

In the following description of the invention, a colloidal dispersion of a cerium (IV) compound in an aqueous medium is also designated a "sol".

And by the expression "weakly acidic" is intended a pH higher than or equal to 3.5.

2. Description of the Prior Art

For numerous applications in the field of catalysis, in particular for catalysis entailing postcombustion reactions of automotive exhaust gases in catalytic converters, there currently exists a great demand for aqueous sols of a cerium compound having weak acidity.

It is described in published European Application No. 87/400,600.0 that aqueous colloidal dispersions of a cerium (IV) compound can be directly obtained by dispersing in water a cerium (IV) compound having the general formula (1):

$$Ce(OH)_x(NO_3)_y, pCeO_2.nH_2O \qquad (1)$$

wherein:
(i) x is such that $x = 4 - y$;
(ii) y ranges from 0.35 to 1.5;
(iii) p is greater than or equal to 0 and less than or equal to 2.0;
(iv) n is greater than or equal to 0 and less than or equal to about 20.

The resulting sol is stable and has a pH ranging from 1 to 2.5.

It is possible, by basification to a pH of approximately 3, to produce a sol containing coarser colloids and having good stability.

However, this process is not suitable for producing a sol having a lower acidity.

SUMMARY OF THE INVENTION

Accordingly, a major object of the present invention is the provision of improved aqueous colloidal dispersions of cerium values which are but weakly acidic and which, preferably, are highly concentrated in cerium.

Briefly, the present invention features the preparation of such weakly acidic aqueous colloidal dispersions of a cerium (IV) compound by:

(a) destabilizing an aqueous colloidal dispersion of a cerium (IV) compound by reaction with a water-soluble salt of a monovalent acid having a pKa ranging from 2.5 to 5.0;
(b) separating the resulting precipitate; and
(c) subsequently redispersing said precipitate in an aqueous medium.

DETAILED DESCRIPTION OF THE PREFERRED EMBODIMENTS OF THE INVENTION

More particularly according to the present invention, it has now unexpectedly and surprisingly been found that by destabilizing an aqueous colloidal dispersion of a compound of cerium (IV) utilizing a monovalent acid such as defined above, a precipitate is formed which, by dispersing same in water, produces a weakly acidic colloidal dispersion, the characteristics of which are hereinafter set forth.

Representative starting materials suitable for use in the invention are those sols obtained by dispersing in water a cerium (IV) compound having the following general formula (I):

$$Ce(M)_z(OH)_x(NO_3)_y, pCeO_2.nH_2O \qquad (I)$$

wherein:
(i) M represents an alkali metal or a quaternary ammonium radical;
(ii) z ranges from 0 to 0.2;
(iii) y ranges from 0 to 1.5;
(iv) x is such that $x = 4 - y + x$;
(v) p ranges from 0 to 2.0;
(vi) n ranges from 0 to approximately 20.

The concentration of the cerium (IV) compound in the sol is not critical. If expressed in $CeO_2$, it ranges from 0.1 to 2.5 moles/liter, and preferably from 0.5 to 1 mole/liter.

The proportion of cerium (IV) in the colloidal state is preferably greater than 95%, but sols in which cerium (IV) is present in the ionic state are also comprehended hereby. Even more preferably, the proportion of cerium ranges from 99% to 100%.

The size of the colloids present in the sol may vary over a rather wide range. Generally, the mean hydrodynamic diameter of the colloids, determined by the quasi-elastic diffusion of light described by Michael L. McConnell in *Analytical Chemistry*, 53, No. 8 1007 A (1981), ranges from 50 Å to 2000 Å.

The aforedescribed sols are known materials and are described in published European Application No. 87/400,601.0.

Consistent herewith, sols are preferably used that are described in published European Application No. 87/400,600.0. These are produced by dispersing in water a cerium (IV) compound having the following general formula (II):

$$Ce(OH)_x(NO_3)_y, pCeO_2.nH_2O \qquad (II)$$

wherein:
(i) x is such that $x = 4 - y$;
(ii) y ranges from 0.35 to 1.5;
(iii) p is greater than or equal to 0 and less than or equal to 2.0;
(iv) n is greater than or equal to 0 and less than or equal to approximately 20.

The sol contains colloids, the sizes of which range over the rather wide limits of from 100 Å to 1,000 Å.

By basification until a pH of 3.0 is obtained, it is possible to produce coarser colloids, the hydrodynamic diameter of which ranges from 300 Å to 2,000 Å.

The sols having the aforesaid colloid sizes are produced by dispersing the cerium (IV) compound of formula (II) in water; such cerium (IV) compound is directly dispersible in water. This compound is dispersed under agitation in an aqueous medium or a slightly acidic medium such that it provides a sol having a pH of from 1 to 2.5.

The cerium (IV) compound of formula (II) is prepared by a process comprising, in a first stage, hydrolyzing an aqueous solution of a cerium (IV) salt in an acid medium, in a second stage, separating the precipitate which results, and, in a third stage, which is not obligatory, heat treating said separated precipitate.

In the first stage, the hydrolysis of an aqueous solution of a cerium (IV) salt is carried out.

For the purpose, a solution of cerium (IV) values, which may be an aqueous solution of ceric nitrate, is selected as the starting material. The solution may contain cerium in the cerous state without disadvantage, but it is desirable that it contain at least 85% cerium (IV) to obtain good precipitation yields.

The solution of the cerium salt is selected such that it will contain no impurities that may be transferred into the final product. It may be advantageous to use a solution of a cerium salt having a degree of purity higher than 99%.

The concentration of the cerium salt solution is not a critical factor according to the invention. When expressed as cerium (IV), it may range from 0.3 to 3 moles per liter, preferably from 0.5 to 1.5 moles/liter.

Exemplary starting materials are ceric nitrate solutions produced by the action of nitric acid on a hydrated ceric oxide prepared in a conventional manner, by reacting a solution of a cerous salt, for example cerous carbonate, with an ammonia solution in the presence of hydrogen peroxide.

The ceric nitrate solution produced by the electrolytic oxidation of a solution of cerous nitrate, as described in published French Application No. 2,570,087 (French Patent No. 84/13641) is a preferred starting material.

The medium of hydrolysis is water, the nature of which is not critical and which is preferably distilled or deionized water.

The acidity may be adjusted by the addition of a mineral acid. Nitric acid is preferably selected. A concentrated acid may be used, or one diluted to, for example, $10^{-2}$N.

It may also comprise a ceric nitrate solution, which may be slightly acidic and have a normality ranging from 0.01N to 5N, preferably from 0.1N to 1N.

The amount of $H^+$ ions introduced for the hydrolysis is such that the molar ratio $[H^+]/[Ce^{(IV)}eq.]$ is greater than or equal to 0 and less than or equal to 3, and which preferably ranges from 0.4 to 2.5.

The proportion of the aqueous solution of the cerium (IV) salt and the hydrolysis medium (essentially water) is such that the final equivalent cerium (IV) concentration ranges from 0.1 to 1.0 mole/liter, preferably from 0.2 to 0.6 mole/liter.

The final equivalent cerium (IV) concentration is defined by the following equation:

$$[Ce^{(IV)}eq.] = ([Ce^{(IV)}] \times V')/(V+V')$$

wherein:
(i) $[Ce^{(IV)}]$ is the concentration, in moles/liter, of the solution of the cerium (IV) salt;
(ii) V represents the volume of water with the optionally added acid;
(iii) V' represents the volume of the cerium (IV) solution.

The hydrolysis of the cerium (IV) salt carried out under the aforedescribed conditions, occurs at 70° to 120° C. and preferably at the reflux temperature of the reaction medium, which is about 100° C.

It is easier to conduct the operation at the reflux temperature, which is readily controlled and reproduced.

The hydrolysis stage may be carried out according to any one of a number of different variants. For example, the solution of the cerium (IV) salt may be added to the water optionally containing the acid, in a single batch, gradually or continuously, said water being heated to the reaction temperature, or conversely.

It is also possible to carry out the process continuously. For this, the mixture of the solution of the cerium (IV) salt and the hydrolysis medium is effected simultaneously and continuously, and the mixture is continuously heated at the selected reaction temperature.

In a preferred embodiment of the invention, the mixture of the cerium (IV) salt solution and the hydrolysis medium is prepared and said mixture is then maintained under agitation at the reaction temperature.

Regardless of the embodiment of the invention, the formation of a precipitate is observed. The reaction time may range from 2 to 8 h and preferably from 3 to 6 h.

The second stage of the process entails separating, by conventional methods, the reaction mass which is present in the form of a suspension, the temperature of which most typically ranges from 90° to 100° C. This operation is carried out before or after the cooling of the reaction mass to ambient temperature, most often to a temperature ranging from 10° to 25° C.

The precipitate is separated by conventional separation methods: filtration, decantation, drying and centrifugation.

A third stage of the process of the invention comprises heat treating the separated precipitate.

This operation is optional, as it has been determined that the precipitate separated after the first hydrolysis stage is directly dispersible in water, and that it is possible to directly obtain an aqueous sol by dispersing the separated precipitate in water without any need for the preliminary drying of same. In effect, the drying stage is not critical and the elimination of all of the free water is not required.

The drying conditions may vary over wide limits. Thus, the temperature may range from 15° to 100° C. and preferably from ambient temperature to 50° C. The duration of drying preferably ranges from 5 to 48 h in order to produce a dry product (n=0). The drying operation may be carried out in air or under reduced pressure, for example at a pressure of from 1 to 100 mm mercury (133.322 Pa to 13332.2 Pa).

Regardless of the degree of hydration of the cerium (IV) compound having the formula (II), a cerium (IV) compound directly dispersible in water is produced. By dispersing such compound in water, a colloidal sol is produced, the colloids of which having hydrodynamic diameters ranging from 100 Å to 1,000 Å.

Preferably, a sol is used that is produced by dispersing in water a cerium (IV) compound having the formula (II) and which is directly obtained from the separation stage, without a drying operation.

Exemplary of other sols that are also suitable for use in the present invention are those generally having a mean hydrodynamic diameter ranging from 300 Å to 600 Å and prepared by a process comprising forming a dispersion of hydrated ceric oxide with water and an acid, in particular nitric acid, and heating the resulting suspension, with the amount of acid present in the dispersion being such that the pH thereof is less than 5.4. The beginning hydrated ceric oxide is prepared by reacting a solution of a cerous salt, for example cerous carbonate, with an ammonia solution, in the presence of an oxidizing agent, in particular hydrogen peroxide.

For more details concerning the preparation of the sol, see published French Application No. 2,416,867.

According to the present invention, a salt of a monovalent acid is used to destabilize the above-described sol.

An ammonium or an alkali metal salt is used, preferably the sodium salt, the selection of which is governed by the fact that it must be soluble in water, be monovalent and have a $pK_a$ ranging from 2.5 to 5.0.

As specific examples of suitable such acid salts, those of acetic acid, propionic acid, and monochloracetic acid are representative.

Sodium acetate is the preferred salt.

The salt is preferably used in the form of an aqueous solution, but it may also be in the solid state.

The concentration of the solution of said salt is not critical and essentially depends on solubility factors.

The amount of the salt of the monovalent acid is determined in a manner such that it is at least equal to the critical concentration of the coagulation of the cerium sol and preferably does not exceed twice the critical coagulation concentration thereof.

By "critical coagulation concentration" is intended the amount of salt required to precipitate all of the cerium in solution.

For a sol having a given concentration in cerium cation, a series of experiments is conducted wherein the concentration of the monovalent acid salt is gradually increased.

A precipitate is formed, which is then separated by centrifugation.

A threshhold of the salt concentration (critical coagulation concentration) is established, beginning at which the cerium determined, for example by volumetric analysis with the aid of a titered solution of iron (II) and the determination in turn of the excess iron (II) by means of a titered chromium (VI) solution, is absent for the supernatant, and then a zone of concentration, the upper limit of which corresponds to twice the critical coagulation concentration.

Generally, the molar ratio between the salt of the monovalent acid and the cerium salt, expressed as the metallic cation thereof, preferably ranges from 0.2 to 0.8 and even more preferably, from 0.3 to 0.6.

In a practical manner, the salt of the monovalent acid is added to the aqueous colloidal dispersion of the cerium (IV) compound, or conversely. The addition may be carried out all at once, gradually or continuously, and under agitation.

Preferably, the salt is added to the aqueous colloidal dispersion of the cerium (IV) compound.

The mixture is prepared at a temperature that is preferably less than or equal to 60° C., and preferably is ambient temperature (typically ranging from 10° to 25° C.).

Upon completion of the addition of the salt of the monovalent acid, the reaction medium may optionally be maintained under agitation for a certain period of time in order to perfect the precipitation; this period of time is not critical and may range from 1 min to 24 h.

The second stage of the process comprises separating the resulting precipitate by conventional solid/liquid separation methods: filtration, decantation, centrifugation or drying.

This separation is generally carried out at ambient temperature.

The separation is effected such that the separated precipitate is well dried and has a water content preferably ranging from 30% to 40%.

In a last stage of the process of the invention, the precipitate separated in this manner is dispersed in water.

The nature of the water is not critical and distilled water is preferably used.

The preparation of the sol is preferably carried out under agitation, at a temperature of from 15° to 40° C., preferably at ambient temperature.

The present invention also features novel colloidal dispersions of a cerium (IV) compound in an aqueous medium, wherein the colloids have the following chemical formula (III):

$$Ce(A)_x(NO_3)_y(OH)_{4-x-y} \qquad (III)$$

in which:
(i) A represents the anion of a monovalent acid which is soluble in water and has a $pK_a$ ranging from 2.5 to 5.0;
(ii) x is a number greater than or equal to 0.2 and less than or equal to 0.8;
(iii) y is a number greater than or equal to 0.01 and less than or equal to 0.1.

The chemical composition of the colloids is determined in the residue obtained after the ultracentrifugation of the dispersion, by analyzing the cerium by the aforementioned method, the nitrate ions by determining the nitrogen content by the Kjeldahl method and the elemental determination of carbon.

The preferred sol of the invention is that in which the colloids correspond to formula (III), in which A represents the acetate, propionate or monochloracetate and even more preferably the acetate; x is greater than or equal to 0.3 and less than or equal to 0.6.

A further characteristic of the sols of the invention is that they have a pH of from 3.5 to 5.0 and preferably from 4.0 to 5.0.

In the resulting sols, the cerium (IV) compound is present essentially in the form of a colloidal dispersion in water, which connotes that said compound has particles of colloidal dimensions, but this does not exclude the presence of cerium (IV) in the ionic form.

The proportion of cerium (IV) in the colloidal state is generally greater than 95% and preferably ranges from 99% to 100%.

The aqueous sols of the invention may have a cerium concentration, expressed as $CeO_2$, of up to 2.5 moles per liter.

The size of the colloids is determined by measuring the mean hydrodynamic diameter thereof, by the quasi-elastic diffusion of light according to the method described by Michael L. McConnell in *Analytical Chemistry*, Vol. 53, No. 8, 1007 A (1981). It depends on the pH of the sol, with the coarseness of the colloids increasing with the value of the pH of the sol.

Generally, the mean hydrodynamic diameter of the colloids ranges from 200 Å to 1,000 Å and most frequently from 300 Å to 600 Å.

It will be appreciated that the sols produced by the process of the invention are perfectly stable under the usual storage conditions, as will hereinafter be seen.

In order to further illustrate the present invention and the advantages thereof, the following specific examples are given, it being understood that same are intended only as illustrative and in nowise limitative. In said examples to follow, all parts and percentages are given by weight.

EXAMPLE 1

(a) Preparation of an aqueous sol of a cerium (IV) compound

Into a 4 liter three-necked flask equipped with a thermometer, agitating means, a system for the introduction of reagents, a reflux condenser and heating means, the following materials were introduced at ambient temperature:

(i) 1,256 cm$^3$ distilled water, (ii) 744 cm$^3$ of a ceric nitrate solution prepared by electrolysis according to the method described in published French Application No. 2,570,087 and containing 1.25 moles/liter cerium (IV), 0.05 mole/liter cerium (III), and having a free acidity of 0.5N.

In the hydrolysis medium, the concentration in cerium (IV), expressed as $CeO_2$, was equal to 80 g/liter and the molar ratio $[H^+]/[Ce^{IV}eq.]$ was equal to 0.4.

The reaction medium was maintained under agitation and at reflux for 4 h.

Filtration was carried out on sintered glass (porosity No. 4).

192 g of a yellow precipitate containing 65% $CeO_2$ were collected.

99 g of said precipitate were added to distilled water in an amount sufficient to produce a volume of 500 cm$^3$.

A sol was produced having a concentration in cerium (IV), expressed as $CeO_2$, of 129 g/liter (0.75M), a pH of approximately 1.0, and a mean hydrodynamic diameter of the colloids of 500 Å.

(b) Preparation of an aqueous sol of cerium with a pH=4:

Into a 2 liter three-necked flask equipped with a thermometer, agitating means, and a system for the introduction of reagents, the following materials were introduced at ambient temperature: 500 cm$^3$ of the aqueous sol of a cerium (IV) compound prepared according to (a), then 250 cm$^3$ of a 0.675M sodium acetate solution.

In the reaction medium, the molar ratio of sodium acetate/cerium was equal to 0.45.

The reaction medium was maintained under agitation for 60 min, after which a solid/liquid separation was carried out by centrifugation. The operation is conducted at 3000 rpm for 10 min.

A residue of approximately 100 g and a supernatant liquid containing less than 0.5 g $CeO_2$ were obtained.

99 g of the precipitate separated in this manner were added to 130 cm$^3$ distilled water.

A sol was produced containing colloids corresponding to the following chemical formula $Ce(CH_3COO)_{0.3}$-$(NO_3)_{0.05}(OH)_{3.65}$, having a concentration in cerium (IV), expressed as $CeO_2$, of 385 g/liter, and a pH of 4.0.

Examination by the quasi-elastic diffusion of light evidenced the presence of colloids having a mean hydrodynamic diameter of 480 Å.

EXAMPLE 2

(a) Preparation of an aqueous sol of a cerium (IV) compound

This was carried out in accordance with the operating procedure of Example 1.

(b) Preparation of an aqueous sol of cerium with a pH=4.9:

Into the apparatus described in Example 1(b), the following materials were introduced at ambient temperature: 500 cm$^3$ of the aqueous sol of the cerium (IV) compound prepared according to (a) and, subsequently, 250 cm$^3$ of a 0.9M sodium acetate solution.

In the reaction medium, the molar ratio sodium acetate/cerium may equal to 0.6.

The reaction medium was maintained under agitation for 60 min, after which a solid/liquid separation was carried out by centrifugation. The operation was conducted at 3,000 rpm for 10 min.

A residue of approximately 100 g and a supernatant liquid containing less than 0.5 $CeO_2$ were obtained.

99 g of the precipitate separated in this manner were added to 300 cm$^3$ distilled water.

A sol was produced which contained colloids corresponding to the following chemical formula: $Ce(CH_3COO)_{0.35}(NO_3)_{0.05}(OH)_{3.60}$, having a cerium (IV) concentration, expressed as $CeO_2$, of 195 g/liter, and a pH of 4.9.

Examination by the quasi-elastic diffusion of light evidenced the presence of colloids having a mean hydrodynamic diameter of 950 Å.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A weakly acidic colloidal dispersion of a cerium (IV) compound in an aqueous medium, having a pH of at least 3.5 the colloids of which having the following general formula (III):

$$Ce(A)_x(NO_3)_y(OH)_{4-x-y} \quad \text{(III)}$$

in which A is the anion of a water-soluble monovalent carboxylic acid having a $pK_a$ of from 2.5 to 5.0, x is a number greater than or equal to 0.2 and less than or equal to 0.8, and y is a number greater than or equal to 0.01 and less than or equal to 0.1.

2. The colloidal dispersion as defined by claim 1, wherein A is the acetate, propionate or monochloroacetate.

3. The colloidal dispersion as defined by claim 2, wherein A is the acetate.

4. The colloidal dispersion as defined by claim 1, wherein x is greater than or equal to 0.3 and less than or equal to 0.6.

5. The colloidal dispersion as defined by claim 1, having a pH ranging from 3.5 to 5.0.

6. The colloidal dispersion as defined by claim 5, having a pH ranging from 4.0 to 5.0.

7. The colloidal dispersion as defined by claim 1, wherein more than 95% of said cerium (IV) values are in colloidal state.

8. The colloidal dispersion as defined by claim 1, having a concentration in cerium (IV) values, expressed as $CeO_2$, of up to 2.5 moles/liter.

9. The colloidal dispersion as defined by claim 1, wherein the mean hydrodynamic diameter of the colloids thereof ranges from 200 Å to 1,000 Å.

10. The colloidal dispersion as defined by claim 9, said mean hydrodynamic diameter ranging from 300 Å to 600 Å.

11. The colloidal dispersion as defined by claim 7, at least 99% of said cerium (IV) values being in colloidal state.

12. A process for producing a weakly acidic colloidal dispersion of a cerium (IV) compound in an aqueous medium, comprising (a) reacting and destabilizing an aqueous colloidal dispersion of a cerium (IV) compound with a water-soluble salt of a monovalent acid having a $pK_a$ of from 2.5 to 5.0, (b) separating the precipitate which results, and (c) redispersing the precipitate thus separated in an aqueous medium.

13. The process as defined by claim 12, said aqueous colloidal dispersion comprising a cerium (IV) compound having the following general formula (I):

$$Ce(M)_z(OH)_x(NO_3)_y, pCeO_2 \cdot n\, H_2O \qquad (I)$$

wherein M is an alkali metal or a quaternary ammonium radical, z ranges from 0 to 0.2, y ranges from 0 to 1.5, x is such that $x = 4 - y + z$, p ranges from 0 to 2.0, and n ranges from 0 to about 20.

14. The process as defined by claim 13, wherein the concentration of said cerium (IV) compound in the colloidal dispersion ranges from 0.1 to 2.5 moles/liter.

15. The process as defined by claim 14, said concentration ranging from 0.5 to 1 mole/liter.

16. The process as defined by claim 13, wherein more than 95% of said cerium (IV) values are in colloidal state.

17. The process as defined by claim 13, wherein the mean hydrodynamic diameter of the colloids ranges from 50 Å to 2,000 Å.

18. The process as defined by claim 13, said aqueous colloidal dispersion having been prepared by dispersing, in water, a cerium (IV) compound having the following general formula (II):

$$Ce(OH)_x(NO_3)_y, p\, CeO_2 \cdot n\, H_2O \qquad (II)$$

wherein x is such that $x = 4 - y$, y ranges from 0.35 to 1.5, p ranges from 0 to 2.0, and n ranges from 0 to about 20.

19. The process as defined by claim 18, said cerium (IV) compound having been prepared by hydrolyzing an aqueous solution of a cerium (IV) salt in an acid medium, wherein the molar ratio $[H^+]/[Ce^{(IV)}eq.]$ ranges from 0 to 3, separating the resulting precipitate, and, optionally, heat treating such precipitate.

20. The process as defined by claim 19, said molar ratio $[H^+]/[Ce^{(IV)}eq.]$ ranging from 0.4 to 2.5.

21. The process as defined by claim 19, comprising directly dispersing said separated precipitate in water.

22. The process as defined by claim 13, said water-soluble salt comprising an alkali metal or ammonium salt of acetic, propionic or monochloroacetic acid.

23. The process as defined by claim 22, said water-soluble salt comprising sodium acetate.

24. The process as defined by claim 19, wherein the amount of said water-soluble salt is at least equal to the critical coagulation concentration of said cerium (IV) salt, but not more than double said critical coagulation concentration.

25. The process as defined by claim 24, wherein the molar ratio of said water-soluble salt to said cerium (IV) salt, expressed as the metallic cation thereof, ranges from 0.2 to 0.8.

26. The process as defined by claim 25, said molar ratio ranging from 0.3 to 0.6.

27. The process as defined by claim 12, comprising adding said water-soluble salt to said aqueous colloidal dispersion of a cerium (IV) compound.

28. The process as defined by claim 12, comprising conducting said reaction at a temperature of from ambient to 60° C.

29. The process as defined by claim 12, comprising conducting said precipitation under agitation.

30. The process as defined by claim 12, said separated precipitate having a water content of from 30% to 40%.

31. The process as defined by claim 12, wherein said separated precipitate is redispersed in distilled water.

* * * * *